(12) United States Patent
Lin

(10) Patent No.: US 9,344,504 B2
(45) Date of Patent: May 17, 2016

(54) ESTABLISHING NEIGHBOR CONNECTION

(71) Applicant: Hangzhou H3C Technologies Co., Ltd., Hangzhou (CN)

(72) Inventor: Changwang Lin, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/646,254

(22) PCT Filed: Oct. 30, 2013

(86) PCT No.: PCT/CN2013/086190
§ 371 (c)(1),
(2) Date: May 20, 2015

(87) PCT Pub. No.: WO2014/079306
PCT Pub. Date: May 30, 2014

(65) Prior Publication Data
US 2015/0288766 A1   Oct. 8, 2015

(30) Foreign Application Priority Data
Nov. 23, 2012   (CN) .......................... 2012 1 0483114

(51) Int. Cl.
*G06F 15/16* (2006.01)
*H04L 29/08* (2006.01)
(Continued)

(52) U.S. Cl.
CPC .......... *H04L 67/141* (2013.01); *H04L 12/6418* (2013.01); *H04L 45/02* (2013.01); *H04L 45/04* (2013.01); *H04L 45/12* (2013.01); *H04L 45/32* (2013.01); *H04L 67/10* (2013.01)

(58) Field of Classification Search
CPC .... H04L 12/6418; H04L 67/10; H04L 67/141
USPC ......................................... 709/227, 238, 242
See application file for complete search history.

(56) References Cited

U.S. PATENT DOCUMENTS 6,628,643 B1 * 9/2003 Park et al. ..................... 370/351
7,269,133 B2    9/2007 Lu et al.
(Continued)

FOREIGN PATENT DOCUMENTS

CN            101350789         1/2009

OTHER PUBLICATIONS

International Search Report and Written Opinion dated Feb. 20, 2014 issued on PCT Patent Application No. PCT/CN2013/086190 dated Oct. 30, 2013, The State Intellectual Property Office, P.R. China.
(Continued)

*Primary Examiner* — Mohamed Wasel
(74) *Attorney, Agent, or Firm* — Mannava & Kang, P.C.

(57) ABSTRACT

According to an example, virtual systems are established in a same Intermediate System to Intermediate System (IS-IS) process as a local IS-IS system. Each local IS-IS system and virtual system can enable a maximum of M IS-IS interfaces. A system is selected for each IS-IS interface from the local IS-IS system and the virtual systems. A virtual neighbor connection is established between the local IS-IS system and each of the virtual systems, and a route cost of the neighbor connection is 0. For an IS-IS interface connected to a remote device, a packet is sent for establishing a neighbor connection with the remote device, the packet carrying a system ID of the IS-IS interface.

15 Claims, 6 Drawing Sheets

(51) Int. Cl.
*H04L 12/64* (2006.01)
*H04L 12/751* (2013.01)
*H04L 12/721* (2013.01)
*H04L 12/715* (2013.01)

(56) References Cited

U.S. PATENT DOCUMENTS

| | | | |
|---|---|---|---|
| 7,466,661 | B1 | 12/2008 | Previdi et al. |
| 8,913,485 | B2 * | 12/2014 | Lu et al. ......................... 370/219 |
| 2005/0275532 | A1 | 12/2005 | Ferri et al. |
| 2006/0007865 | A1 * | 1/2006 | White et al. .................. 370/238 |
| 2008/0186844 | A1 * | 8/2008 | He et al. ........................ 370/217 |
| 2009/0080436 | A1 * | 3/2009 | White et al. .............. 370/395.31 |
| 2009/0324222 | A1 | 12/2009 | Kunjidhapatham et al. |
| 2010/0020797 | A1 | 1/2010 | Casey et al. |
| 2010/0111086 | A1 | 5/2010 | Tremblay et al. |
| 2010/0287128 | A1 * | 11/2010 | Baltatu et al. .................... 706/12 |
| 2012/0320796 | A1 * | 12/2012 | Xia et al. ....................... 370/254 |
| 2013/0070604 | A1 * | 3/2013 | Lu et al. ......................... 370/238 |

OTHER PUBLICATIONS

Extended European Search Report dated Mar. 3, 2016, EP Patent Application No. 13856105.5 dated Oct. 30, 2013, pp. 1-6, European Patent Office.

* cited by examiner

ESTABLISHING NEIGHBOR CONNECTION

CLAIM FOR PRIORITY

The present application is a national stage filing under 35 U.S.C 371 of PCT application number PCT/CN2013/086190, having an international filing date of Oct. 30, 2013, which claims priority to Chinese patent application number 201210483114.7 having a filing date of Nov. 23, 2012 the disclosures of which are hereby incorporated by reference in their entireties.

BACKGROUND

Intermediate System to Intermediate System (IS-IS) is an Interior Gateway Protocol (IGP) defined in International Organization for Standardization (ISO)/International Engineering Consortium (IEC) 10589 and in Internet Standard RFC 1142 published by the Internet Engineering Task Force (IETF). IS-IS may be used for link state routing in packet switching networks. For link state routing, the nodes construct a map of the connectivity to the network, e.g., in the form of a graph, showing which nodes are connected to which other nodes. Each node may then independently calculate best paths from it to every possible destination in the network. The collection of best paths forms the node's routing table.

In IS-IS, different IS-IS interfaces on the same device are identified by using different IS-IS interface IDs. The types of interfaces supported by IS-IS mainly include Broadcast Network, Point-to-Point (P2P) network, and Non-Broadcast Multi-Access (NBMA) network. NBMA links are configured as sub-interfaces to support IS-IS, and the type of the sub-interface is P2P or Broadcast Network.

DETAILED DESCRIPTION

In order to make the purpose, solutions and merit more clear, the present disclosure is illustrated in detail hereinafter with reference to the accompanying drawings and specific examples.

Figure 1:
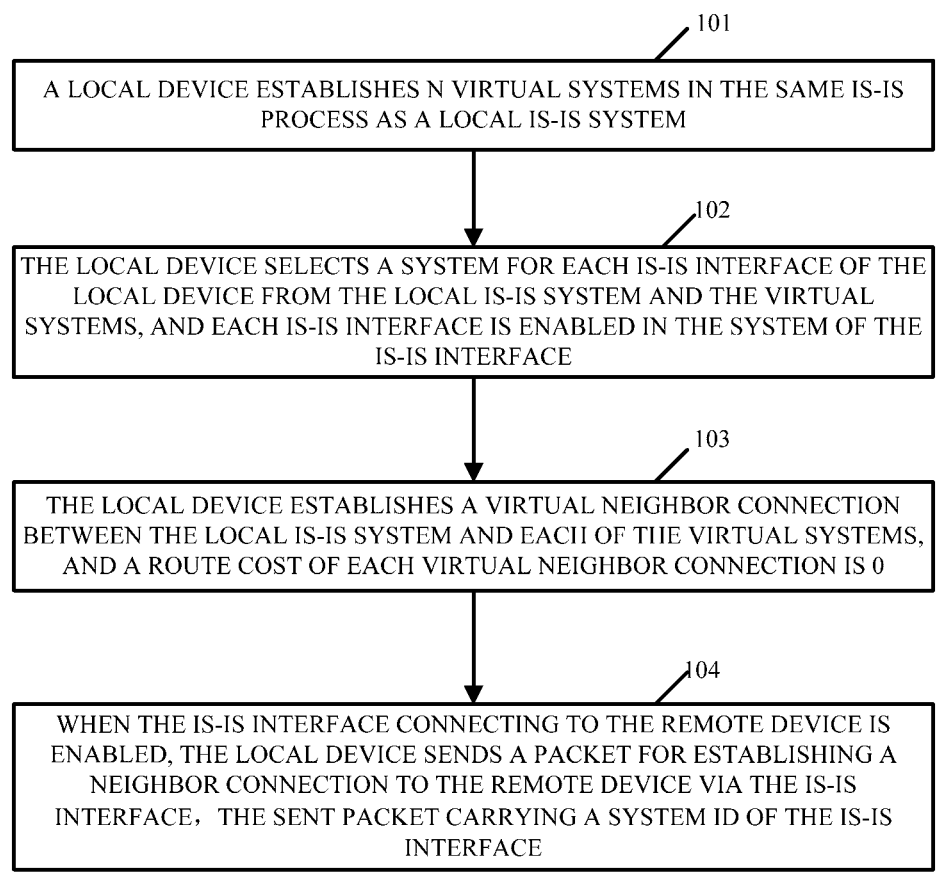
FIG. 1 is a schematic flowchart illustrating an example method.

FIG. 1 is a schematic flowchart illustrating an example method.

In the method, virtual systems are established in a same IS-IS process as a local IS-IS system. Each local IS-IS system and virtual system can enable a maximum of M IS-IS interfaces. A system is selected for each IS-IS interface from the local IS-IS system and the virtual systems. A virtual neighbor connection is established between the local IS-IS system and each of the virtual systems, and a route cost of the neighbor connection is 0. For an IS-IS interface connected to a remote device, a packet is sent for establishing a neighbor connection with the remote device, the packet carrying a system ID of the IS-IS interface.

As shown in FIG. 1, the method includes the following processing.

In block 101, a local device establishes N virtual systems in the same IS-IS process as a local IS-IS system, where N is an integer greater than or equal to 1. A virtual system may be a virtual machine or other virtual environment. A local IS-IS system is an IS-IS system originally running on a local device. An IS-IS process may be a process on a local device and used for executing an IS-IS protocol. The N virtual systems and the local IS-IS system are all included in the IS-IS process. A local device may be any device that can run the virtual systems and execute an IS-IS protocol.

In some examples, the local IS-IS system and each of the virtual systems have the same function, i.e., the local IS-IS system and each of the virtual systems are allowed to enable at most M IS-IS interfaces. M is an integer greater than 1 that represents a maximum number of allowed IS-IS interfaces for a local device. As can be seen, by establishing the virtual systems, the IS-IS interfaces of the local device are extended. According to an example, when the IS-IS protocol is used, the value of M may be 256, when another application is used, the value of M may be changed. In the following descriptions, the local IS-IS system and each of the virtual systems have the same function and are allowed to enable 256 IS-IS interfaces at most.

Figure 2:
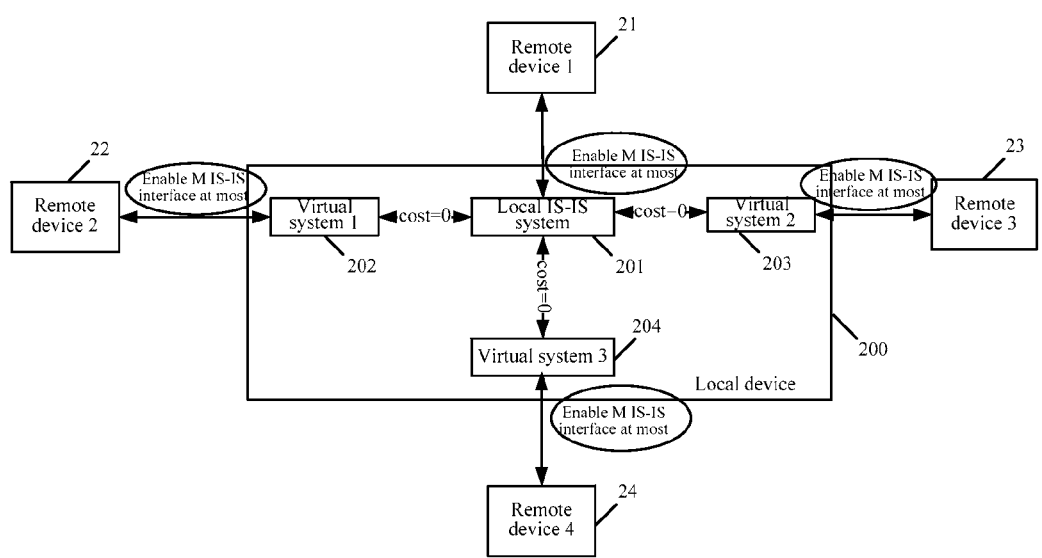
FIG. 2 is a schematic diagram illustrating an example IS-IS interface extension.

As indicated above, N for example is larger than or equal to 1 and may be configured according to networking requirements. As an example, according to the networking requirements, the local device needs to connect with 256*4 remote devices. Because the local IS-IS system and each of the virtual systems in the example are allowed to enable 256 IS-IS interfaces at most, 3 virtual systems are needed for the local device based on the local IS-IS system, that is, the value of N is 3. As shown in FIG. 2, a local device 200 includes a local IS-IS system 201 and establishes a virtual system 202, a virtual system 203 and a virtual system 204. The local IS-IS system 201 connected to a remote device 21, the virtual system 202 connected to a remote device 22, the virtual system 203 connected to a remote device 23, and the virtual system 204 connected to a remote device 24.

In some examples, the local IS-IS system and N virtual systems are identified by using different system IDs, that is, the local IS-IS system and N virtual systems have different system IDs which are globally unique. For example, when the local IS-IS system and N virtual systems are all in the same IS-IS process (e.g., IS-IS process 1), the system IDs of the local IS-IS system and N virtual systems may be described by the following codes: configurations of the local IS-IS system in IS-IS process 1 include:

network 11.0001.0001.0000.00, herein, 11 is an area identifier of the local device, 0001.0001.0000 is a system ID of the local IS-IS system;

configurations of the virtual systems are shown in table 1.

TABLE 1

| virtual system number | system ID |
|---|---|
| 1 | 0001.0001.0001 |
| 2 | 0001.0001.0002 |
| 3 | 0001.0001.0003 |
| … | … |
| N | 0001.0001.N. |

In block 102, the local device selects a system for each IS-IS interface of the local device from the local IS-IS system and the virtual systems, and each IS-IS interface is enabled in the system of the IS-IS interface.

In block 103, the local device establishes a virtual neighbor connection between the local IS-IS system and each of the virtual systems, and a route cost of each virtual neighbor connection is 0. A route cost for example is a link metric that may be associated with an outgoing interface and describes the cost of using one or more links to connect to a destination. The route cost of each virtual neighbor connection being 0 means that the local IS-IS system and the N virtual systems are regarded as a whole.

In an example, the virtual neighbor connection established between the local IS-IS system and the virtual system may be a virtual P2P neighbor connection. In this way, the virtual P2P neighbor connections exist between the local IS-IS system and each of the virtual systems. The virtual P2P neighbor connection may be configured in advance with a cost of 0. When the cost of the virtual P2P neighbor connection is configured as 0, a remote device does not wrongly calculate routes after the virtual system is introduced to the local device, and the remote device calculates the routes by taking the local IS-IS system and the virtual system as a whole, thereby ensuring correct route calculation.

In block 104, to establish a neighbor connection to a remote device via an IS-IS interface of the local device, when the IS-IS interface connecting to the remote device is enabled, the local device sends a packet for establishing the neighbor connection to the remote device via the IS-IS interface. The sent packet carries a system ID of the IS-IS interface, so that the system of the IS-IS interface may establish the neighbor connection with the remote device.

According to an example, the packet for establishing the neighbor connection may be a hello packet in the IS-IS protocol. The types of the hello packet may be level 1 and level 2.

For example, the packet for establishing the neighbor connection is the hello packet, and the local device has 3 interfaces: interface eth1/0, interface eth2/0 and interface eth3/0. Interface eth1/0 is connected to remote device 1, interface eth2/0 is connected to remote device 2, and interface eth3/0 is connected to remote device 3. Interface eth1/0 is enabled in the local IS-IS system, and the system ID of eth1/0 is 0001.0001.0000; interface eth2/0 is enabled in a virtual system, and the system ID of eth2/0 is 0001.0001.0001; and interface eth3/0 is enabled in a virtual system, and the system ID of eth3/0 is 0001.0001.0002.

Based on the descriptions of block 104, the local device may establish the neighbor connection with remote device 1 by using a hello packet carrying the system ID of 0001.0001.0000, and communicate with remote device 1. Similarly, the local device may establish the neighbor connection with remote device 2 by using a hello packet carrying the system ID of 0001.0001.0001. To communicate with remote device 2, the local device may establish the neighbor connection with remote device 3 by using a hello packet carrying the system ID of 0001.0001.0002. Accordingly, the local device may establish neighbor connections with remote devices under different systems. In one example, since the local IS-IS system or the virtual system is allowed to enable 256 IS-IS interfaces, the local device is not limited to enable 256 IS-IS interfaces at most, and the number of neighbor connections established between the local device and the remote devices is not limited.

Figure 3:
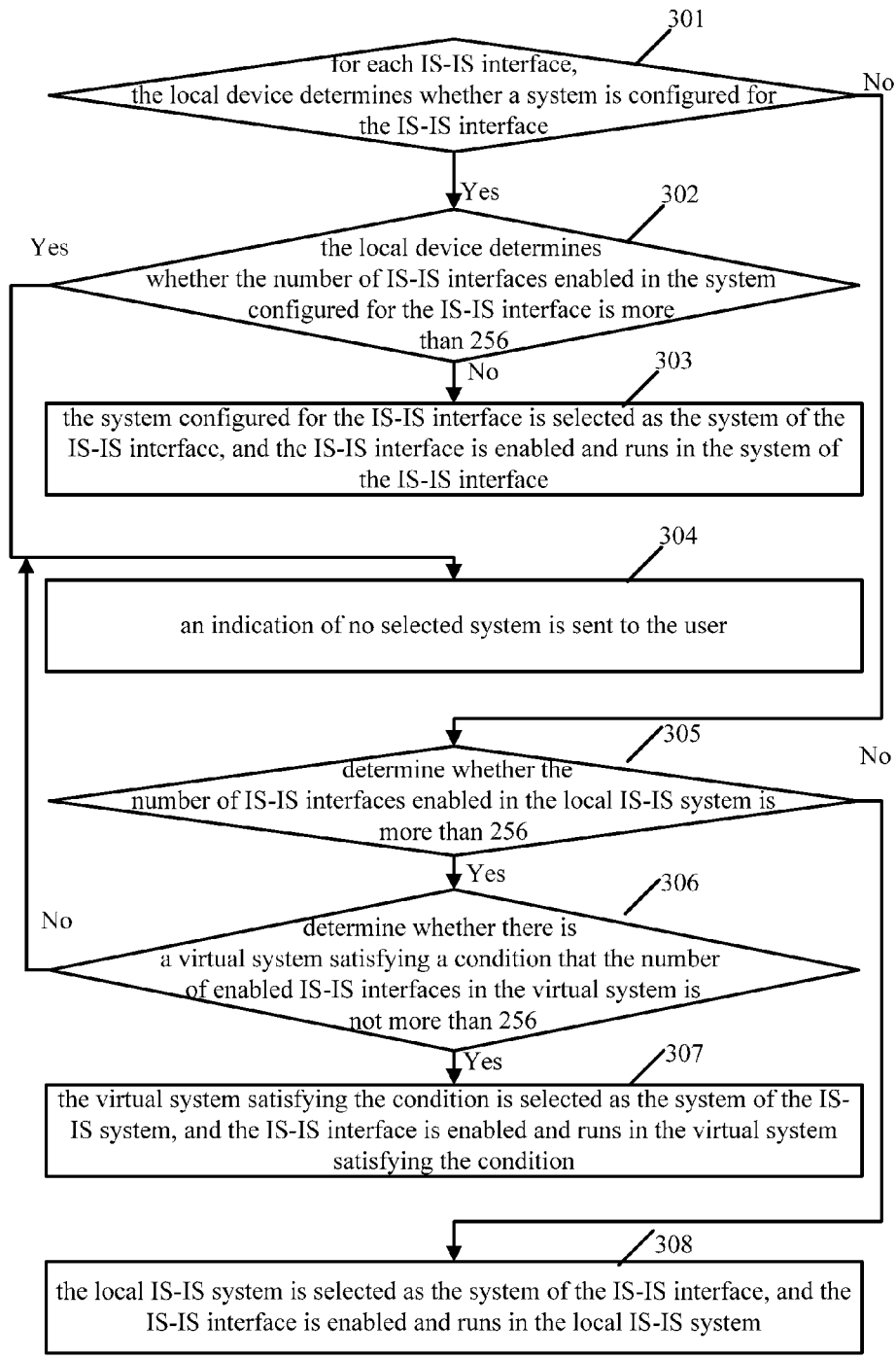
FIG. 3 is a schematic flowchart illustrating an example procedure of selecting a system for each IS-IS interface of a local device.

FIG. 3 is a schematic flowchart illustrating an example procedure of selecting a system for each IS-IS interface of a local device.

In block 301, for each IS-IS interface of the local device, the local device determines whether a system is configured for the IS-IS interface. If a system is configured for the IS-IS interface, block 302 is performed; otherwise, block 305 is performed.

In block 302, the local device determines whether the number of IS-IS interfaces enabled in the system configured for the IS-IS interface is more than a maximum number of interfaces, such as 256. If the number of the IS-IS interfaces enabled in the system configured for the IS-IS interface is not more than 256, block 303 is performed; otherwise, block 304 is performed. In other examples, other maximum values may be used and may be dependent on a maximum number of different system IDs that can be assigned which in turn may be based on a number of system ID bits that can be used to specify a system ID in a packet field.

In an example, virtual system 1 is configured for IS-IS interface 1, and it is indicated that IS-IS interface 1 is to be enabled and run in virtual system 1. In block 302, the local IS-IS system or any one of the virtual systems is allowed to enable 256 IS-IS interfaces at most, After virtual system 1 is configured for the IS-IS interface 1, for the purpose of making virtual system 1 satisfy this limitation, block 302 is performed to determine whether the number of the IS-IS interfaces enabled in virtual system 1 is more than 256, and different blocks are performed according to different determination results.

In block 303, the system configured for the IS-IS interface is selected as the system of the IS-IS interface, and the IS-IS interface is enabled and runs in the system of the IS-IS interface. The current procedure is terminated.

For example, if virtual system 1 is configured for IS-IS interface 1 and it is determined in block 302 that the number of IS-IS interfaces enabled in virtual system 1 is not more than 256, then in block 303, virtual system 1 is selected as the system of IS-IS interface 1, and IS-IS interface 1 is enabled and runs in virtual system 1.

In block 304, an indication of no selected system is sent to the user, and the current procedure is terminated.

The indication includes a reason that there is no selected system. For example, the indication may indicate that the number of IS-IS interfaces enabled in the system configured for the IS-IS interface is more than 256.

In block 305, it is determined whether the number of IS-IS interfaces enabled in the local IS-IS system is more than 256, if the number of the IS-IS interfaces enabled in the local IS-IS system is more than 256, block 306 is performed; otherwise, block 308 is performed.

According to an example, when no system is configured for the IS-IS interface, the IS-IS interface is regarded as belonging to the local IS-IS system firstly, and block 305 is performed.

In block 306, it is determined whether there is a virtual system satisfying a condition that the number of enabled IS-IS interfaces in the virtual system is not more than 256, if there is a virtual system satisfying the condition, block 307 is performed; otherwise, block 304 is performed.

In block 307, the virtual system satisfying the condition is selected as the system of the IS-IS system, and the IS-IS interface is enabled and runs in the virtual system satisfying the condition. The current procedure is terminated.

In block 308, the local IS-IS system is selected as the system of the IS-IS interface, and the IS-IS interface is enabled and runs in the local IS-IS system. The current procedure is terminated.

According to the procedure shown in FIG. 3, the system of the IS-IS system is selected. In an example, the local device has 3 IS-IS interfaces, interface eth1/0, interface eth 2/0 and interface eth3/0. According to the procedure shown in FIG. 3, eth1/0 is enabled and runs in the local IS-IS system, eth2/0 is enabled and runs in a virtual system having a system ID 0001.0001.0001 (referred to as a first virtual system), and eth3/0 is enabled and runs in a virtual system having a system ID 0001.0001.0002 (referred to as a second virtual system), the local IS-IS system, the first virtual system and the second virtual system are all under IS-IS process 1, and thus the above three IS-IS interfaces may be enabled and run in the system via the following codes:

interface eth1/0: isis enable 1;
interface eth2/0: isis enable 1 0001.0001.0001;
interface eth3/0: isis enable 1 0001.0001.0002.

Figure 4:
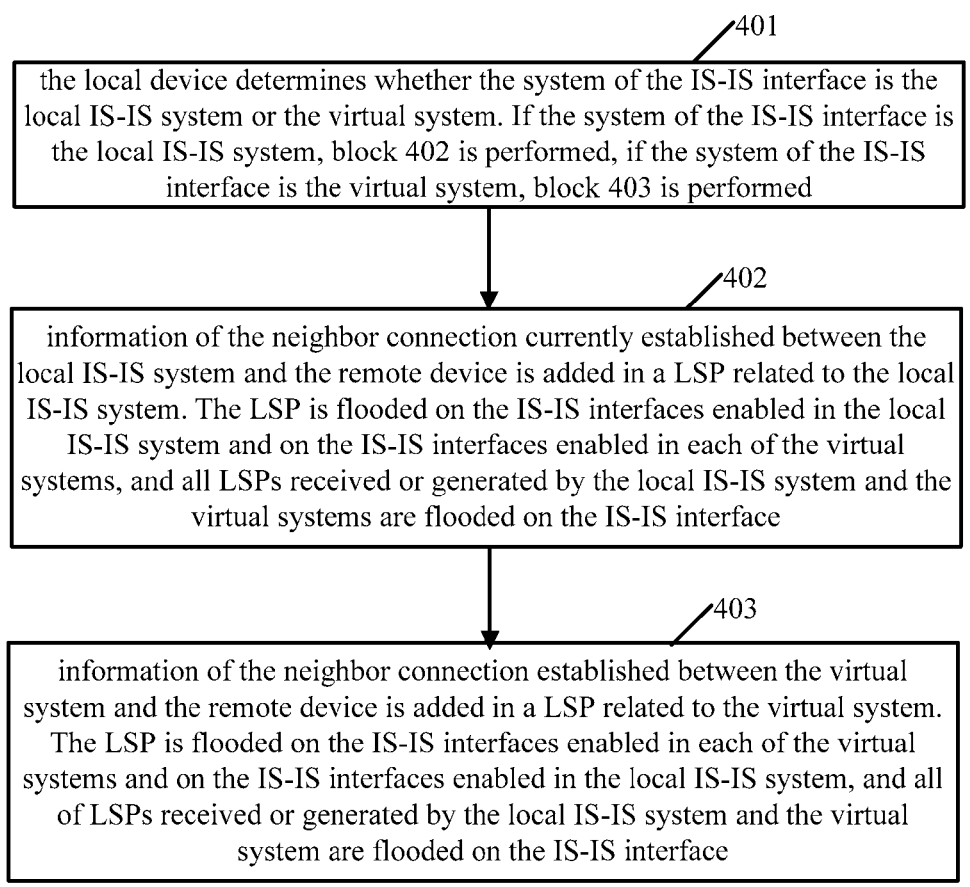
FIG. 4 is a schematic flowchart illustrating an example procedure of flooding a Link State Protocol data unit (LSP).

In some examples, in block 104, a procedure shown in FIG. 4 may be performed by the local device after a neighbor connection is established between the system of the IS-IS interface and the remote device.

FIG. 4 is a schematic flowchart illustrating a procedure of flooding a LSP in accordance with an example of the present disclosure. As shown in FIG. 4, the procedure include the following processing.

In block 401, the local device determines whether the system of the IS-IS interface is the local IS-IS system or the virtual system. If the system of the IS-IS interface is the local IS-IS system, block 402 is performed. If the system of the IS-IS interface is the virtual system, block 403 is performed.

In block 402, information of the neighbor connection currently established between the local IS-IS system and the remote device is added in a Link State Protocol data unit (LSP) related to the local IS-IS system. The LSP is flooded on at least one IS-IS interface enabled in the local IS-IS system and on the at least one IS-IS interface enabled in each of the virtual systems, and all LSPs received or generated by the local IS-IS system and the virtual systems are flooded on the IS-IS interface.

In an example, the neighbor connection established between the local IS-IS system in the local device and the remote device is the neighbor connection established between the local IS-IS system in the local device and the local IS-IS system or the virtual system in the remote device. In block 402, the information of the neighbor connection currently established between the local IS-IS system and the remote device at least includes: a cost of the neighbor connection, and a system ID of the local IS-IS system or the virtual system in the remote device. The cost of the neighbor connection is determined by using a route calculation of the local device. For example, when the local IS-IS system of the local device establishes the neighbor connection with the virtual system in the remote device (referred to as virtual system a), the information of the neighbor connection currently established between the local IS-IS system and the remote device at least includes a cost of the neighbor connection, and a system ID of virtual system in the remote device.

According to an example, the information of the neighbor connection established between the local IS-IS system and the remote device may be added to the LSP via adding a neighbor Type Length Value (TLV) in the LSP, and each neighbor TLV corresponds to a neighbor connection information. There are three fields in the neighbor TLV, i.e. T field, L field, and V field. The T field includes the type of the neighbor; the L field includes the total length of the neighbor TLV; and the V field at least includes a system ID of a opposite system of the neighbor connection and the cost of a neighbor connection. For example, when the local IS-IS system of the local device establishes the neighbor connection with the virtual system a, in block 402, a neighbor TLV is added to the LSP related to the local IS-IS system. The V field of the neighbor TLV carries a system ID of virtual system and a neighbor connection cost. The neighbor connection cost is a neighbor connection cost between the local IS-IS system of the local device and the virtual system of the remote device, and is determined by the local device by using route calculation.

In addition, in block 402, the LSP related to the local IS-IS system may be determined according to the following processing.

It is determined whether at least one LSP belonging to the local IS-IS system is generated by the local device.

If at least one LSP belonging to the local IS-IS system is generated by the local device, when one LSP in the at least one LSP satisfies a condition of allowing to add the information of the neighbor connection established between the local IS-IS system and the remote device (i.e. the LSP can carry the information of the neighbor connection established between the local IS-IS system and the remote device), the LSP satisfying the condition is determined as the LSP related to the local IS-IS system.

If no LSP belonging to the local IS-IS system is generated by the local device or if all LSPs belonging to the local IS-IS system generated by the local device do not satisfy the above condition, a new LSP belonging to the local IS-IS system is generated, and the new LSP is determined as the LSP related to the local IS-IS system.

The LSP belonging to the local IS-IS system includes information of a virtual neighbor connection established between the local IS-IS system and each of the virtual systems, and the information of the virtual neighbor connection includes a system ID of the virtual system and a cost of the virtual neighbor connection.

In block 403, information of the neighbor connection established between the virtual system and the remote device is added in a LSP related to the virtual system. The LSP is flooded on the IS-IS interfaces enabled in each of the virtual systems and on the IS-IS interfaces enabled in the local IS-IS system, and all of LSPs received or generated by the local IS-IS system and the virtual system are flooded on the IS-IS interface.

Similar to block 402, in block 403, the LSP related to the virtual system may be determined according to the following processing.

It is determined whether at least one LSP belonging to the virtual system is generated by the local device.

If at least one LSP belonging to the virtual system is generated by the local device, when one LSP in the at least one LSP satisfies a condition of allowing to add the information of the neighbor connection established between the virtual system and the remote device, the LSP satisfying the condition is determined as the LSP related to the virtual system.

If no LSP belonging to the virtual system is generated by the local device or if at least one LSP belonging to the virtual system generated by the local device does not satisfy the above condition, a new LSP belonging to the virtual system is generated, and the new LSP is determined as the LSP related to the virtual system.

The LSP belonging to the virtual system includes information of a virtual neighbor connection established between the virtual system and the local IS-IS system, and the information of the virtual neighbor connection at least includes a system ID of the local IS-IS system and a cost of the virtual neighbor connection.

In block 403, the mode for adding the information of the neighbor connection in the LSP related to the virtual system is similar with the mode for adding the information of the neighbor connection in the LSP related to the local IS-IS system. Thus, the procedure of FIG. 4 is finished.

Figure 5:
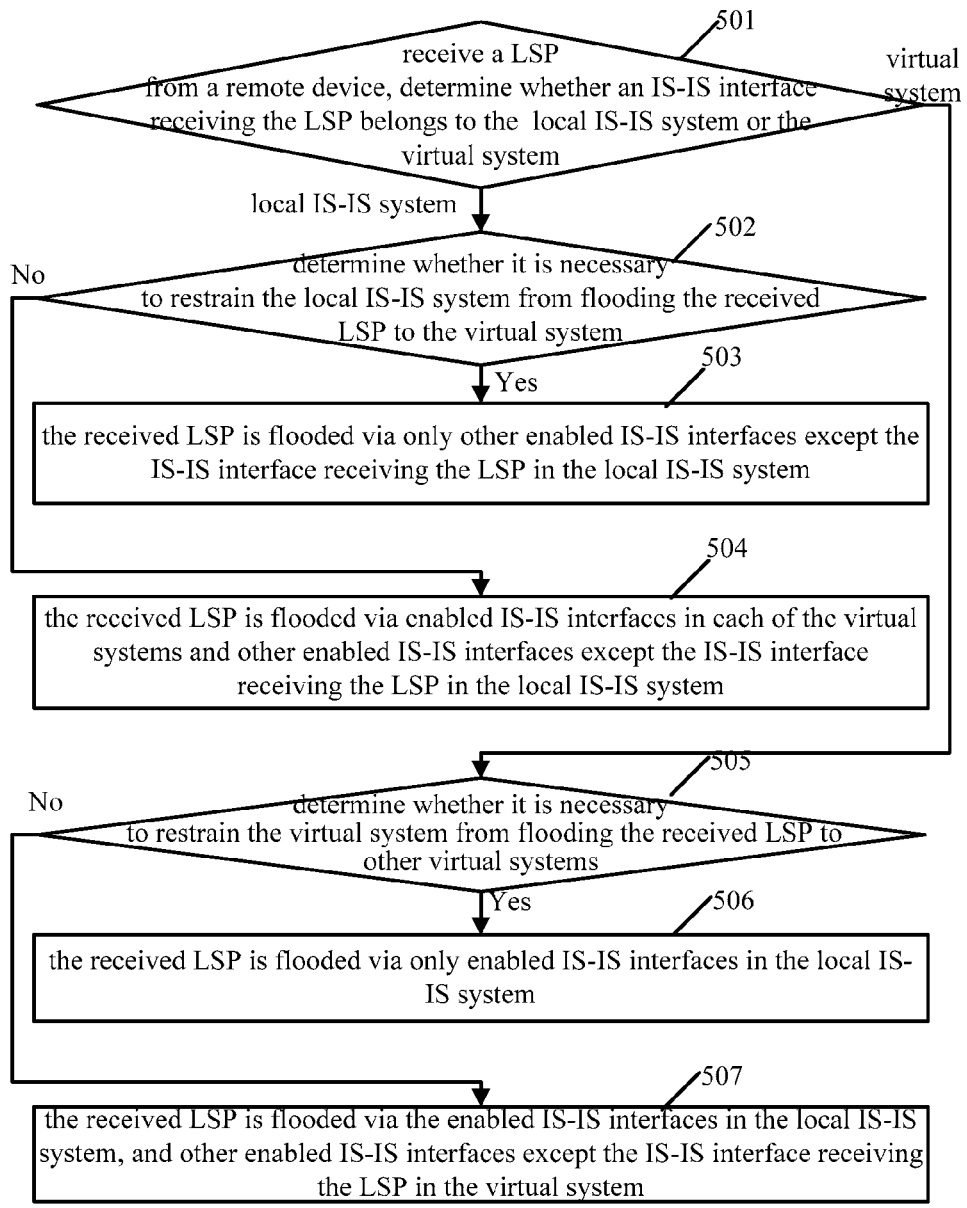
FIG. 5 is a schematic flowchart illustrating another example procedure of flooding a LSP in accordance.

According to an example, the local device may receive a LSP from a remote device and process the LSP, as shown in FIG. 5.

FIG. 5 is a schematic flowchart illustrating another example procedure of flooding a LSP in accordance. As shown in FIG. 5, the example procedure includes the following processing.

In block 501, the local device receives a LSP from a remote device; determines whether an IS-IS interface receiving the LSP belongs to the local IS-IS system or the virtual system; if the IS-IS interface receiving the LSP belongs to the local IS-IS system, block 502 is performed; and if the IS-IS interface receiving the LSP belongs to the virtual system, block 505 is performed.

In block 502, it is determined whether it is necessary to restrain the local IS-IS system from flooding the received LSP to the virtual system. If it is necessary to restrain the local IS-IS system from flooding the received LSP to the virtual system, block 503 is performed, and if it is unnecessary to restrain the local IS-IS system from flooding the received LSP to the virtual system, block 504 is performed.

In block 502, the operation of restraining the local IS-IS system from flooding the received LSP to the virtual system is to isolate the local IS-IS system from the virtual system. After the determining in block 502, the isolating from the local IS-IS system and the virtual system is optional, and flexibility of the examples is improved.

In block 503, the received LSP is flooded via only other enabled IS-IS interfaces except the IS-IS interface receiving the LSP in the local IS-IS system. The procedure is terminated.

After block 503, the IS-IS system is isolated from the virtual system.

In block 504, the received LSP is flooded via enabled IS-IS interfaces in each of the virtual systems and other enabled IS-IS interfaces except the IS-IS interface receiving the LSP in the local IS-IS system. The procedure is terminated.

In block 505, it is determined whether it is necessary to restrain the virtual system from flooding the received LSP to other virtual systems. If it is necessary to restrain the virtual system from flooding the received LSP to the other virtual systems, block 506 is performed, and if it is unnecessary to restrain the virtual system from flooding the received LSP to the other virtual systems, block 507 is performed.

After the determining in block 505, the isolation between two virtual systems is optional, and flexibility of the examples is improved.

In block 506, the received LSP is flooded via only enabled IS-IS interfaces in the local IS-IS system. The procedure is terminated.

After block 503, the two virtual systems are isolated from each other.

In block 507, the received LSP is flooded via the enabled IS-IS interfaces in the local IS-IS system, and other enabled IS-IS interfaces except the IS-IS interface receiving the LSP in the virtual system. The procedure is terminated. Thus, the procedure shown in FIG. 5 is terminated.

Figure 6:
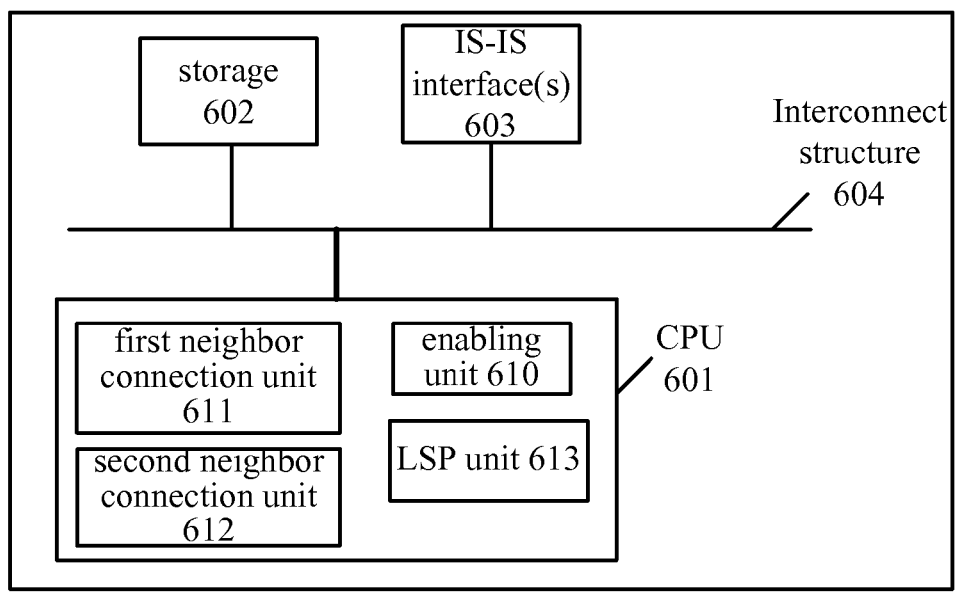
FIG. 6 is a schematic diagram illustrating an example apparatus.

FIG. 6 is a schematic diagram illustrating an example apparatus in accordance with an example of the present disclosure. For example, the apparatus may be a network device for establishing a neighbor connection, and the network device is referred to as a local device hereinafter. In some examples, the apparatus may be the local device 200 shown in FIG. 2. The apparatus may perform the methods, functions and operations described above. As shown in FIG. 6, the apparatus includes a storage 602, at least one IS-IS interface 603, a central processing unit (CPU) 601 and an interconnect structure 604 such as a bus.

The storage 602 is to store N virtual systems in a same IS-IS process as a local IS-IS system, whereby N is larger than or equal to 1, the local IS-IS system and the N virtual systems are identified by using different system IDs respectively, and each of the local IS-IS system and N virtual systems is allowed to enable M IS-IS interfaces at most. In some examples, the storage 602 is one or more storage devices, such a memory, hard drive, etc.

The CPU 601 may execute machine readable instructions for an enabling unit 610, a first neighbor connection unit 611, a second neighbor connection unit 612 and an LSP unit 613. The machine readable instructions may be stored in the storage 602 but the units 610-613 are shown in the CPU 601 to represent that their machine readable instructions are executed by the CPU 601.

The enabling unit 610 is to select a system for each of the IS-IS interfaces 603 of the local device from the local IS-IS system and the virtual systems, and enable each of the IS-IS interfaces 603 in the system of the IS-IS interface.

The first neighbor connection unit 611 is to establish a virtual neighbor connection between the local IS-IS system and each of the virtual systems, and a route cost of the neighbor connection is 0.

The second neighbor connection unit 612 is to, when any one of the IS-IS interfaces 603 is connected to a remote device, send a packet for establishing a neighbor connection with a remote device to the remote device via the IS-IS interface; the packet carries a system ID of the IS-IS interface, so that the system of the IS-IS interface may establish the neighbor connection with the remote device.

According to an example, when the enabling unit 610 selects the system for each of the IS-IS interfaces 603 of the local device, the enabling unit 610 is to: for each of the IS-IS interfaces 603 of the local device, if a system is configured for the IS-IS interface, select the system of the IS-IS interface according to the system configured for the IS-IS interface; if no system is configured for the IS-IS interface, determine whether the number of IS-IS interfaces enabled in the local IS-IS system is more than M; if the number of the IS-IS interfaces enabled in the local IS-IS system is more than M, search for a virtual system in which the number of enabled IS-IS interfaces is not more than M from the N virtual systems, and select a virtual system searched out as the system of the IS-IS interface; and if the number of the IS-IS interfaces enabled in the local IS-IS system is not more than M, select the local IS-IS system as the system of the IS-IS interface.

According to an example, as shown in FIG. 6, the CPU 601 further includes a LSP unit 613. The LSP unit 613 is to, after establishing a neighbor connection between the system of the IS-IS interface and the remote device, determine whether the system of the IS-IS interface is the local IS-IS system or the virtual system.

If the system of the IS-IS interface is the local IS-IS system, the LSP unit 613 is to add information of the neighbor connection established between the local IS-IS system and the remote device in a LSP related to the local IS-IS system; flood the LSP on at least one IS-IS interface enabled in the local IS-IS system and on at least one IS-IS interface enabled in each of the virtual systems; and flood all of LSPs received or generated by the local IS-IS system and the virtual systems on the IS-IS interface corresponding to the system of the IS-IS interface.

And if the system of the IS-IS interface is the virtual system, the LSP unit 613 is to add information of the neighbor connection established between the virtual system and the remote device in a LSP related to the virtual system; flood the LSP on at least one IS-IS interfaces enabled in each of the virtual systems and on at least one IS-IS interface enabled in the local IS-IS system; and flood all of LSPs received or generated by the local IS-IS system and the virtual system on the IS-IS interface corresponding to the system of the IS-IS interface.

According to an example, when establishing the neighbor connection with the remote device, the second neighbor connection unit 612 is to establish the neighbor connection with a local IS-IS system or a virtual system in the remote device. Accordingly, information of the neighbor connection established with the remote device includes at least a cost of the neighbor connection, a system ID of the local IS-IS system or the virtual system in the remote device; the cost of the neighbor connection is determined by using a route calculation of the local device.

According to an example, the LSP unit 613 may determine the LSP related to the local IS-IS system. When determining the LSP related to the local IS-IS system, the LSP unit 613 is to determine whether at least one LSP belonging to the local IS-IS system is generated by the local IS-IS system.

If at least one LSP belonging to the local IS-IS system is generated by the local device, when one LSP in the at least one LSP satisfies a condition of allowing to add the information of the neighbor connection established between the local IS-IS system and the remote device, the LSP unit 613 may determine the LSP satisfying the condition as the LSP related to the local IS-IS system.

If no LSP belonging to the local IS-IS system is generated by the local device or if all LSPs belonging to the local IS-IS system generated by the local device do not satisfy the above condition, the LSP unit 613 may generate a new LSP belonging to the local IS-IS system, and determine the new LSP as the LSP related to the local IS-IS system.

The LSP belonging to the local IS-IS system includes: information of a virtual neighbor connection established between the local IS-IS system and each of the virtual systems, and the information of the virtual neighbor connection comprises at least a system ID of the virtual system and a cost of the virtual neighbor connection.

Similar, the LSP unit 613 may determine the LSP related to the virtual system. When determining the LSP related to the virtual system, the LSP unit 613 is to determine whether at least one LSP belonging to the virtual system is generated by the local device. If at least one LSP belonging to the virtual system is generated by the local device, when one LSP in the at least one LSP satisfies a condition of allowing to add the information of the neighbor connection established between the virtual system and the remote device, the LSP unit 613 may determine the LSP satisfying the condition as the LSP related to the virtual system.

If no LSP belonging to the virtual system is generated by the local device or if at least one LSP belonging to the virtual system generated by the local device does not satisfy the condition, the LSP unit 613 may generate a new LSP belonging to the virtual system, and determine the new LSP as the LSP related to the virtual system.

The LSP belonging to the virtual system includes: information of a virtual neighbor connection established between the virtual system and the local IS-IS system, and the information of the virtual neighbor connection comprises at least a system ID of the local IS-IS system and a cost of the virtual neighbor connection.

According to an example, the LSP unit 613 is further to receive a LSP from the remote device, determine whether an IS-IS interface receiving the LSP belongs to the local IS-IS system or the virtual system.

If IS-IS interface receiving the LSP belongs to the local IS-IS system, the LSP unit 613 is to determine whether it is necessary to restrain the local IS-IS system from flooding the received LSP to the virtual system. If it is necessary to restrain the local IS-IS system from flooding the received LSP to the virtual system, the LSP unit 613 is to flood the received LSP via only other enabled IS-IS interfaces except the IS-IS interface receiving the LSP in the local IS-IS system. If it is unnecessary to restrain the local IS-IS system from flooding the received LSP to the virtual system, the LSP unit 613 is to flood the received LSP via enabled IS-IS interfaces in each of the virtual systems and other enabled IS-IS interfaces except the IS-IS interface receiving the LSP in the local IS-IS system.

If the IS-IS interface receiving the LSP belongs to the virtual system, the LSP unit 613 is to determine whether it is necessary to restrain the virtual system from flooding the received LSP to other virtual systems. If it is necessary to restrain the virtual system from flooding the received LSP to the other virtual system, the LSP unit 613 is to flood the received LSP via only enabled IS-IS interfaces in the local IS-IS system. If it is unnecessary to restrain the virtual system from flooding the received LSP to the other virtual systems, the LSP unit 613 is to flood the received LSP via enabled IS-IS interfaces in the local IS-IS system and other enabled IS-IS interfaces except the IS-IS interface receiving the LSP in the virtual system.

As can be seen from the above technical solutions, in examples of the present disclosure, the local device establishes N virtual systems in the same IS-IS process as the local IS-IS system. The local IS-IS system and N virtual systems are identified by using different system IDs, and the local IS-IS system and each of the virtual systems are allowed to enable M IS-IS interfaces at most. The value of N may be determined according to the number of IS-IS interfaces to be connected by the local device. For example, if the value of M is 256, and 256*3 IS-IS interfaces are needed according to the networking requirements of the local device, when the local IS-IS system is allowed to enable 256 IS-IS interfaces at most, the value of N is 2, so that the local device is not limited to enable 256 IS-IS interfaces at most, the number of IS-IS interfaces in the device is increased, the networking size is not limited and the networking requirements are satisfied.

Further, according to examples of the present disclosure, the local device establishes the virtual neighbor connection between the local IS-IS system and each of the virtual system, and the route cost of the neighbor connection is 0, so that the remote device regards all systems of the local device as a whole, thereby ensuring the correction of the route calculation.

In addition, when the local device establishes the neighbor connection with the remote device, different operations are performed for different systems in the local device, so that the local device is further not limited to enable 256 IS-IS interfaces at most.

The methods, modules, units and devices described herein may be implemented by hardware, machine-readable instructions or a combination of hardware and machine-readable instructions. Machine-readable instructions used in the examples disclosed herein may be stored in non-transitory storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A non-transitory machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for establishing a neighbor connection, comprising:
   establishing, by a local device, N virtual systems in a same Intermediate System to Intermediate System (IS-IS) process as a local IS-IS system, wherein
      N is an integer being greater than or equal to 1,
      the local IS-IS system and the N virtual systems are identified using different system IDs, and
   determining, for each IS-IS interface of the local device, a system from the local IS-IS system and the virtual systems;
   enabling, by the local device, each IS-IS interface;
   establishing, by the local device, virtual neighbor connections between the local IS-IS system and each of the virtual systems, each virtual neighbor connection having a route cost of 0; and
   sending, by the local device, a packet to establish a neighbor connection with a remote device via an IS-IS interface connected to the remote device, the packet carrying a system ID of the IS-IS interface.

2. The method of claim 1, wherein each of the local IS-IS system and the N virtual systems are allowed to enable a maximum of M IS-IS interfaces wherein M is an integer greater than 1; and
   determining, for each IS-IS interface of the local device, the system from the local IS-IS system and the virtual systems comprises:
   for each respective IS-IS interface of the local device,
      selecting a system configured for the IS-IS interface; or
      if no system is configured for the respective IS-IS interface, determining whether a number of IS-IS interfaces enabled in the local IS-IS system is more than M, and
      if the number of the IS-IS interfaces enabled in the local IS-IS system is more than M, searching for a virtual system of the virtual systems in which the number of enabled IS-IS interfaces is not more than M, and selecting a found virtual system as the system of the respective IS-IS interface; and if the number of the IS-IS interfaces enabled in the local IS-IS system is not more than M, selecting the local IS-IS system as the system of the respective IS-IS interface.

3. The method of claim 2, wherein selecting the system configured for the IS-IS interface comprises:
   identifying a system configured for the IS-IS interface; and
   if the number of IS-IS interfaces enabled in the identified system is not more than M, selecting the identified system as the system of the IS-IS interface.

4. The method of claim 1, further comprising:
   determining, by the local device, whether the system of the IS-IS interface is the local IS-IS system or one of the virtual systems;
   if a given system of a given IS-IS interface is the local IS-IS system:
      including information of the neighbor connection established between the local IS-IS system and the remote device in a Link State Protocol data unit (LSP) related to the local IS-IS system;
      flooding the LSP on at least one IS-IS interface enabled in the local IS-IS system and on at least one IS-IS interface enabled in each of the virtual systems;
      flooding all of LSPs received or generated by the local IS-IS system and the virtual systems on the given IS-IS interface; and
   if a given system of a given IS-IS interface is one of the virtual systems:
      including information of the neighbor connection established between the one virtual system and the remote device in a LSP related to the one virtual system;
      flooding the LSP on at least one IS-IS interface enabled in each of the virtual systems and on at least one IS-IS interface enabled in the local IS-IS system;
      flooding all of LSPs received or generated by the local IS-IS system and the virtual system on the given IS-IS interface.

5. The method of claim 4, wherein determining the LSP related to the local IS-IS system comprises:
   if at least one LSP belonging to the local IS-IS system is generated by the local device, and satisfies a condition allowing addition of the information of the neighbor connection established between the local IS-IS system and the remote device, using one of the at least one LSP satisfying the condition as the LSP related to the local IS-IS system;
   if no LSP belonging to the local IS-IS system is generated by the local device or if all LSPs belonging to the local IS-IS system generated by the local device do not satisfy the condition, generating a new LSP belonging to the local IS-IS system, and using the new LSP as the LSP related to the local IS-IS system; and wherein the LSP belonging to the local IS-IS system comprises: information on a virtual neighbor connection established between the local IS-IS system and each of the virtual systems, and the information on the virtual neighbor connection comprises at least a system ID of the virtual system and a cost of the virtual neighbor connection.

6. The method of claim 4, wherein determining the LSP related to the virtual system comprises:

if at least one LSP belonging to the virtual system is generated by the local device and satisfies a condition allowing addition to the information of the neighbor connection established between the virtual system and the remote device, using one of the at least one LSP satisfying the condition as the LSP related to the virtual system;

if no LSP belonging to the virtual system is generated by the local device or if all LSPs belonging to the virtual system generated by the local device does not satisfy the condition, generating a new LSP belonging to the virtual system, and using the new LSP as the LSP related to the virtual system;

wherein the LSP belonging to the virtual system comprises: information on a virtual neighbor connection established between the virtual system and the local IS-IS system, and the information on the virtual neighbor connection comprises at least a system ID of the local IS-IS system and a cost of the virtual neighbor connection.

7. The method of claim 4, wherein establishing the neighbor connection with the remote device comprises:

establishing the neighbor connection with a local IS-IS system or a virtual system in the remote device, wherein, information of the neighbor connection established with the remote device comprises at least: a cost of the neighbor connection, a system ID of the local IS-IS system or the virtual system in the remote device, and the cost of the neighbor connection is determined by the local device using a route calculation.

8. The method of claim 1, further comprising:

receiving, by the local device, a Link State Data Protocol data unit (LSP) from the remote device;

determining whether an IS-IS interface receiving the received LSP belongs to the local IS-IS system or one of the N virtual systems;

if the IS-IS interface receiving the received LSP belongs to the local IS-IS system, determining whether to restrain the local IS-IS system from flooding the received LSP to the virtual system;

if it determined to restrain the local IS-IS system from flooding the received LSP to the virtual system, flooding the received LSP via at least one other enabled IS-IS interface except the IS-IS interface receiving the LSP in the local IS-IS system;

if it is determined not to restrain the local IS-IS system from flooding the received LSP to the virtual system, flooding the received LSP via at least one enabled IS-IS interface in each of the virtual systems and at least one other enabled IS-IS interface except the IS-IS interface receiving the LSP in the local IS-IS system;

if the IS-IS interface receiving the LSP belongs to one of the N virtual systems, determining whether to restrain the one of the N virtual systems from flooding the received LSP to other virtual systems;

if it is determined to restrain the virtual system from flooding the received LSP to the other virtual systems, flooding the received LSP via at least one enabled IS-IS interface in the local IS-IS system;

if it is not determined to restrain the virtual system from flooding the received LSP to the other virtual systems, flooding the received LSP via at least one enabled IS-IS interface in the local IS-IS system and at least one other enabled IS-IS interface except the IS-IS interface receiving the LSP in the virtual system.

9. A network device to establish a neighbor connection, the network device comprising: a storage, at least one Intermediate System to Intermediate System (IS-IS) interface and a central processing unit (CPU), wherein the storage is to store N virtual systems in a same IS-IS process as a local IS-IS system, wherein N is an integer greater than or equal to 1, the local IS-IS system and the N virtual systems are identified using different system IDs, and the CPU to execute an enabling unit, a first neighbor connection unit and a second neighbor connection unit, wherein the enabling unit is to determining a system for each IS-IS interface of the local device from the local IS-IS system and the virtual systems, and enable each IS-IS interface;

the first neighbor connection unit is to establish virtual neighbor connections between the local IS-IS system and each of the virtual systems, and each virtual neighbor connection has a route cost of 0;

the second neighbor connection unit is to, send a packet to establish a neighbor connection with a remote device via one IS-IS interface, the packet carrying a system ID of the one IS-IS interface.

10. The network device of claim 9, wherein each of the local IS-IS system and the N virtual systems are allowed to enable a maximum of M IS-IS interfaces wherein M is an integer greater than 1; and when the enabling unit determines the system for each IS-IS interface of the network device, the enabling unit is to:

for each respective IS-IS interface of the network device, select a system configured for the IS-IS interface; or if no system is configured for the respective IS-IS interface, determine whether a number of IS-IS interfaces enabled in the local IS-IS system is more than M; and if the number of the IS-IS interfaces enabled in the local IS-IS system is more than M, search for a virtual system of the virtual systems in which the number of enabled IS-IS interfaces is not more than M, and select a found virtual system as the system of the respective IS-IS interface; and if the number of the IS-IS interfaces enabled in the local IS-IS system is not more than M, select the local IS-IS system as the system of the respective IS-IS interface.

11. The network device of claim 9, wherein the CPU further comprises a link state protocol (LSP) unit;

the LSP unit is to, determine whether the system of the IS-IS interface is the local IS-IS system or one of the virtual systems;

if a given system of a given IS-IS interface is the local IS-IS system, including information of the neighbor connection established between the local IS-IS system and the remote device in a LSP related to the local IS-IS system;

flood the LSP on at least one IS-IS interface enabled in the local IS-IS system and on at least one IS-IS interface enabled in each of the virtual systems;

flood all of LSPs received or generated by the local IS-IS system and the virtual systems on the given IS-IS interface; and if a given system of a given IS-IS interface is one of the virtual systems,
including information of the neighbor connection established between the one virtual system and the remote device in a LSP related to the one virtual system;
flood the LSP on at least one IS-IS interface enabled in each of the virtual systems and on at least one IS-IS interface enabled in the local IS-IS system;
flood all of LSPs received or generated by the local IS-IS system and the virtual system on the given IS-IS interface.

12. The network device of claim 11, wherein when establishing the neighbor connection with the remote device:
the second neighbor connection unit is to establish the neighbor connection with a local IS-IS system or a virtual system in the remote device;
wherein, information of the neighbor connection established with the remote device comprises at least: a cost of the neighbor connection, a system ID of the local IS-IS system or the virtual system in the remote device, and the cost of the neighbor connection is determined by the local device using a route calculation.

13. The network device of claim 11, wherein when determining the LSP related to the local IS-IS system, the LSP unit is to:
if at least one LSP belonging to the local IS-IS system is generated by the network device and satisfies a condition allowing addition to the information of the neighbor connection established between the local IS-IS system and the remote device, use one of the at least one LSP satisfying the condition as the LSP related to the local IS-IS system;
if no LSP belonging to the local IS-IS system is generated by the network device or if all LSPs belonging to the local IS-IS system generated by the network device do not satisfy the above condition, generate a new LSP belonging to the local IS-IS system, and using the new LSP as the LSP related to the local IS-IS system;
wherein the LSP belonging to the local IS-IS system comprises: information on a virtual neighbor connection established between the local IS-IS system and each of the virtual systems, and the information on the virtual neighbor connection comprises at least a system ID of the virtual system and a cost of the virtual neighbor connection.

14. The network device of claim 11, wherein when determining the LSP related to the virtual system, the LSP unit is to:
if at least one LSP belonging to the virtual system is generated by the network device and satisfies a condition allowing addition to the information of the neighbor connection established between the virtual system and the remote device, use one of the at least one LSP satisfying the condition as the LSP related to the virtual system;
if no LSP belonging to the virtual system is generated by the network device or if all LSPs belonging to the virtual system generated by the network device does not satisfy the condition, generate a new LSP belonging to the virtual system, and use the new LSP as the LSP related to the virtual system;
wherein the LSP belonging to the virtual system comprises: information on a virtual neighbor connection established between the virtual system and the local IS-IS system, and the information on the virtual neighbor connection comprises at least a system ID of the local IS-IS system and a cost of the virtual neighbor connection.

15. The network device of claim 11, wherein the LSP unit is further to
receive a LSP from the remote device,
determine whether an IS-IS interface receiving the received LSP belongs to the local IS-IS system or one of the N virtual systems;
if IS-IS interface receiving the received LSP belongs to the local IS-IS system, determine whether to restrain the local IS-IS system from flooding the received LSP to the virtual system:
if it determined to restrain the local IS-IS system from flooding the received LSP to the virtual system, flood the received LSP via at least one other enabled IS-IS interface except the IS-IS interface receiving the LSP in the local IS-IS system;
if it is determined not to restrain the local IS-IS system from flooding the received LSP to the virtual system, flood the received LSP via at least one enabled IS-IS interface in each of the virtual systems and at least one other enabled IS-IS interface except the IS-IS interface receiving the LSP in the local IS-IS system;
if the IS-IS interface receiving the LSP belongs to one of the N virtual systems, determine whether to restrain the one of the N virtual systems from flooding the received LSP to other virtual systems,
if it is determined not to restrain the virtual system from flooding the received LSP to the other virtual system, flood the received LSP via at least one enabled IS-IS interface in the local IS-IS system;
if it is determined not to restrain the virtual system from flooding the received LSP to the other virtual systems, flood the received LSP via at least one enabled IS-IS interface in the local IS-IS system and at least one other enabled IS-IS interface except the IS-IS interface receiving the LSP in the virtual system.

* * * * *